United States Patent

Myhre et al.

(10) Patent No.: US 9,738,540 B2
(45) Date of Patent: Aug. 22, 2017

(54) PROCESS FOR THE PRODUCTION OF ALUMINIUM OXIDE PARTICLES

(71) Applicant: ELKEM AS, Oslo (NO)

(72) Inventors: Bjorn Myhre, Kristiansand (NO); Magne Dastol, Kristiansand (NO)

(73) Assignee: ELKEM AS, Oslo (NO)

( * ) Notice: Subject to any disclaimer, the term of this patent is extended or adjusted under 35 U.S.C. 154(b) by 0 days.

(21) Appl. No.: 15/107,166

(22) PCT Filed: Feb. 9, 2015

(86) PCT No.: PCT/NO2015/050027
§ 371 (c)(1),
(2) Date: Jun. 22, 2016

(87) PCT Pub. No.: WO2015/119508
PCT Pub. Date: Aug. 13, 2015

(65) Prior Publication Data
US 2016/0332888 A1    Nov. 17, 2016

(30) Foreign Application Priority Data

Feb. 10, 2014 (NO) .................................. 20140162

(51) Int. Cl.
*C01F 7/42* (2006.01)
*C01F 7/30* (2006.01)

(52) U.S. Cl.
CPC ............... *C01F 7/42* (2013.01); *C01F 7/302* (2013.01); *C01F 7/422* (2013.01); *C01P 2004/04* (2013.01); *C01P 2004/32* (2013.01); *C01P 2004/62* (2013.01)

(58) Field of Classification Search
CPC ............. C01F 7/42; C01F 7/422; C01F 7/302
USPC .................................................. 423/625, 627
See application file for complete search history.

(56) References Cited

U.S. PATENT DOCUMENTS

| 2,573,057 | A | 10/1951 | Porter |
| 4,291,011 | A | 9/1981 | Griffiths |

FOREIGN PATENT DOCUMENTS

| CA | 2110961 A1 | 6/1994 |
| DE | 2443130 A1 | 3/1975 |
| EP | 0318102 A2 | 5/1989 |
| EP | 0601453 A2 | 6/1994 |
| EP | 1577265 A1 | 9/2005 |
| FR | 2243153 A1 | 4/1975 |
| GB | 691769 | 5/1953 |
| GB | 2182650 A | 5/1987 |
| WO | 2007096447 A1 | 8/2007 |

OTHER PUBLICATIONS

International Search Report dated Apr. 30, 2015 for PCT/NO2015/050027.
Norwegian Search Report for Patent Application No. 20140162.
Written Opinion for PCT/NO2015/050027.

*Primary Examiner* — Matthew E Hoban
*Assistant Examiner* — James Fiorito
(74) *Attorney, Agent, or Firm* — Lucas & Mercanti, LLP

(57) ABSTRACT

The present invention relates to a method for the production of aluminum oxide particles of spherical morphology and with a particles size in the submicron range.

10 Claims, 1 Drawing Sheet

PROCESS FOR THE PRODUCTION OF ALUMINIUM OXIDE PARTICLES

CROSS REFERENCE TO RELATED APPLICATION

This Application is a 371 of PCT/NO2015/050027 filed on Feb. 9, 2015 which, in turn, claimed the priority of Norwegian Patent Application No. 20140162 filed on Feb. 10, 2014, both applications are incorporated herein by reference.

TECHNICAL FIELD

The present invention relates to a process for the preparation of fine spherical particles of aluminium oxide. The particle size of the aluminium oxide is in the submicron range.

BACKGROUND ART

Fine spherical particles of aluminium oxide have a variety of uses, in particular within the field of ceramic materials.

As an example fine spherical particles of aluminium oxide may be used as pigments, abrasives and polishing agents, in refractory and fire-resistant products, in ceramics, as catalyst materials, or as fillers. Depending on the purity of the aluminium oxide the particles may also be used as high-performance structural ceramics, as high-performance polishing agents (for semiconductors), as starting materials for optical and functional ceramics, bioceramics and so forth.

In the prior art aluminium oxide has been prepared by a number of methods, a couple of which will be mentioned below.

U.S. Pat. No. 4,291,011 describes a method for production of aluminum oxide by continuously reacting high purity metallic aluminium, either solid or liquid, with high purity oxygen, present in stoichiometrically excessive amount, within a vertically oriented cylindrical vessel closed at the top and open at the bottom and having cooled side walls on which there forms a layer of solid aluminum oxide. Newly formed aluminum oxide deposits as a liquid film on the inside surface of this layer and flows downwardly thereover by gravity to the open bottom of the container and then falls to a collecting vessel below, solidifying either during this fall or after impingement on a moving metallic surface. An annular array of burners, e.g. oxy-hydrogen burners, limits downward growth of the layer below the vessel, and fosters detachment of the downwardly flowing film in the form of drops to fall to the collection vessel. This process does not give spherical submicron particles of aluminium oxide.

Canadian patent number 2110961 describes a process for preparing aluminum oxide particles, an aluminum oxide powder prepared according to the process and its use. The process comprises the following steps:
introduction of an aluminum carrier, such as Al or $Al_2O_3$ into a furnace unit, heating the aluminum carrier, reduction of the aluminum carrier, unless it is introduced as metallic aluminum, into metallic aluminum and/or aluminum carbides (including aluminum oxycarbides), increasing the furnace temperature to a value at which the metallic aluminum or the aluminum carbides evaporate, subsequent oxidation of the metallic aluminum or aluminum carbides into aluminum oxide in a gas flow, and introduction of the gas flow into a filter, wherein the temperature, the atmosphere, and the hold time of the aluminum oxide particles in the gas flow are adjusted according to the desired particle size. A disadvantage of this process is the use of carbon, which may lead to formation of impurities in the form of carbide and oxycarbides.

The object of the present invention is thus to provide an alternative and improved process, avoiding the disadvantages of the former processes, for the preparation of very fine and pure aluminium oxide particles, in the submicron range (<1.0 μm). An object is also to provide a process which may be carried out in a relatively inexpensive manner.

DESCRIPTION OF THE INVENTION

The principle of the invention is to produce aluminium sub-oxide vapours that are allowed to react with oxygen and thereby form aluminium oxide particles which are of a spherical nature.

The principle is to let aluminium oxide react with aluminium thereby producing gaseous aluminium sub-oxides (e.g. AlO, $Al_2O$) and aluminium vapour that serve as the combusting medium. The production of gaseous aluminium and aluminium sub-oxides by the partial reduction of the oxide is normally a heat consuming reaction. The existence of such a heat reservoir therefore facilitates and stabilizes the process.

The temperature of the aluminium oxide bath is above the meting point of the oxide. Preferred temperature ranges are: 2000-2100° C., 2100-2500° C., 2500-2700° C.

Described is thus a process for the production of spherical submicron particles of a metal oxide, in which a metal oxide and a reducing agent are injected into a reaction vessel comprising a pool of the metal oxide in molten state, serving as a heat reservoir for the process, whereby the metal oxide reacts with the reducing agent producing a metal vapour and metal sub-oxide vapours, whereafter said metal and metal sub-oxide vapours are oxidized to said metal oxide particles.

The present invention thus relates to a process for the production of spherical submicron particles of aluminium oxide ($Al_2O_3$), wherein aluminium oxide and aluminium metal are added into a reaction vessel comprising a pool of aluminium oxide in molten state, serving as a heat reservoir for the process, whereby aluminium oxide reacts with aluminium metal producing aluminium sub-oxides (AlO, $Al_2O$) and aluminium vapour whereafter the sub-oxides and the Al vapour are oxidized above the molten pool of aluminium oxide to give aluminium oxide in the form of spherical submicron particles.

In a preferred embodiment the pool of aluminium oxide comprises 20-50 weight % aluminium oxide and 50-80 weight % zirconium dioxide.

In a further preferred embodiment the pool of aluminium oxide comprises 30-55 weight % aluminium oxide and 45-70 weight % zirconium dioxide In another preferred embodiment the aluminium oxides and aluminium metal are injected into the reaction vessel.

In a further preferred embodiment the oxidation of the aluminium sub-oxides are carried out in air or oxygen.

In a further preferred embodiment a gas is introduced in the melted pool for increasing the partial pressure resulting in an increased amount of aluminium sub-oxide being released from the pool.

This gas is preferably air or nitrogen or other inert gases.

The size of the particles produced lies in the range from submicron to nano-size particles, which means in the range below 1 micrometer.

In a preferred embodiment of the invention the particles prepared have particle size in the range from $10^{-6}$ to $10^{-7}$ m.

In another preferred embodiment of the invention the particles prepared have particle size in the range from $10^{-7}$ to $10^{-8}$ m.

In still a preferred embodiment of the invention the particles prepared have a particle size less than $10^{-8}$ m.

SHORT DESCRIPTION OF THE DRAWINGS

DETAILED DESCRIPTION OF THE INVENTION

The method of the present invention is used for the production of spherical submicron particles of aluminium oxide, $Al_2O_3$, whereby aluminium oxide is reduced with aluminium metal to give gaseous aluminium and aluminium sub-oxides (AlO, $Al_2O$) at temperatures where the partial pressure of combustible gases exceeds 0.1 atmosphere, whereby the pool of reactant is molten aluminium oxide kept at temperatures above the melting point thereof, whereafter gaseous aluminium and the sub-oxides are oxidized above the molten aluminium oxide bath to aluminium oxide which is captured in a filter.

The main reaction for forming the sub-oxide will be:

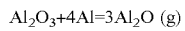

$$Al_2O_3 + 4Al = 3Al_2O \text{ (g)}$$

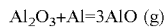

$$Al_2O_3 + Al = 3AlO \text{ (g)}$$

This method is thus an aluminothermic process.

As indicated above, aluminium oxide and aluminium metal are added to the molten bath of aluminium oxide. Preferably the aluminium oxide and aluminium are injected into the molten pool of aluminium oxide, and the resulting aluminium vapours and aluminium sub-oxide gases are combusted immediately after production in the bath.

In one embodiment the pool of aluminium oxide comprises 20-50 weight % aluminium oxide and 50-80 weight % zirconium dioxide. In another embodiment the pool of aluminium oxide comprises 30-55 weight % aluminium oxide and 45-70 weight % zirconium dioxide.

In a molten pool having the above-indicated compositions, the molten pool will have a higher temperature than a molten pool consisting of aluminium oxide only; see e.g., G. Cervales, *Ber. Deut. Keram. Ges.*, 45 [5] 217 (1968) for a phase diagram for the system $Al_2O_3$—$ZrO_2$ showing that the melting point of the compositions described above is higher than for pure aluminium oxide. This will provide a faster reaction when aluminium oxide and metallic aluminium are added to the pool. Thus, a higher productivity of aluminium oxide particles is achieved. Zirconium dioxide in the molten pool will be inert and will not contaminate the aluminium oxide particles.

Figure 1:
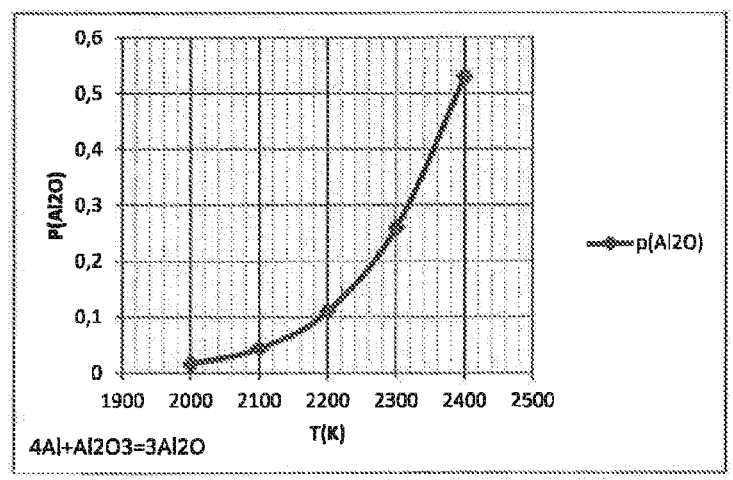
FIG. 1 is a graphic illustration of the partial pressure of aluminium sub-oxide as a function of temperature, in which the partial pressure along the Y-axis is given in atmospheres.
Figure 2:
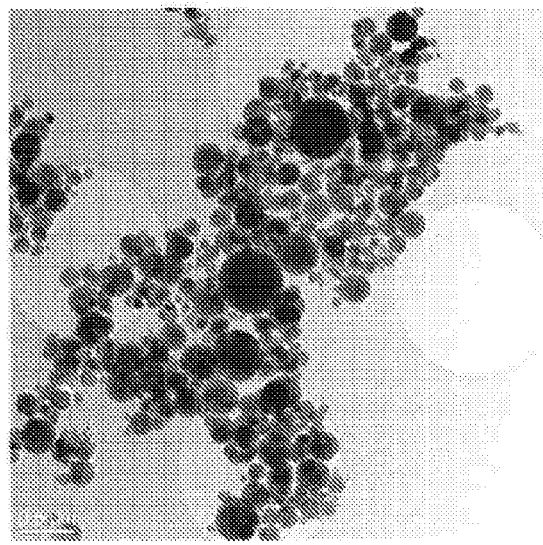
FIG. 2 is a micrograph showing an example of the particles prepared.

In the method for producing spherical submicron particles of aluminium oxide, the reaction of aluminium oxide and aluminium will, as indicated above, give primarily aluminium sub-oxides at temperatures above the melting point of aluminium oxide and at temperature where the partial pressure exceed a certain level. As illustrated in FIG. 1, the partial pressure of aluminium sub-oxide, $Al_2O$, reaches 0.1 atmosphere at 2200 K and thereafter increases rapidly with increasing temperature. From the curve it is seen that the vapour pressure of $Al_2O$ by the reaction starts to become significant at temperatures above approximately 2000° C. (2273K). The pool of molten aluminium oxide is kept at temperatures above the melting point of aluminium oxide, preferably at significantly higher temperature. The reactants are brought into contact with the molten pool of aluminium oxide by injection or other suitable means, and the resulting aluminium vapour and aluminum sub-oxides gasses are combusted by air or oxygen immediately after formation. By this combustion spherical and essentially submicron aluminium oxide particles are obtained.

The process for the preparation of aluminium oxide may be carried out in conventional or modified electrical furnaces for the preparation of fused alumina (brown fused alumina or white fused alumina). Such furnaces exist in different embodiments, known as for instance Higgins furnaces or tilt furnaces, as well as other designs. The typical furnaces will consist of a cylindrical shell of steel equipped with an inner lining of refractive material and an outer water cooling. The energy is provided using graphite or carbon electrodes arranged in a triangular arrangement. The furnace effect may typically be about 1-10 MW. Around the electrodes an open bath may be provided to which metallic aluminium and aluminium oxide may be added. Aluminium may be added in the form of chunks; however, the addition of liquid aluminium may also be envisaged. Aluminium has a lower density than molten alumina, and will therefore exist as a layer on the top of the pool.

The method for the production of alumina can thus be carried out in existing process equipment. In addition a filter will be needed for containing the produced alumina. If desired the off gases from the filter may comprise a simple cleaning facility for $NO_x$, according to the state of the art.

The problem connected with the combustion of liquid aluminium is that a high temperature is necessary to provide ignition (according to our experiments about 1600-1700° C.). Further, it is difficult to maintain the combustion due to oxide (scull) formation. It is also assumed that the reaction proceeds via the gas phase where the first step is endothermic. Thus energy must be supplied continuously to avoid cooling of the aluminium oxide melt and thereby extinguishing of the process. This is possible in a melting furnace with electrodes. Even if the gross reaction $Al+O_2 \rightarrow Al_2O_3$ is strongly exothermic, the heat of combustion is formed a distance above the pool, and may not be available down in the melt.

The pool or bath of molten aluminium oxide (about 2050 degrees C. or more) will serve as a heat buffer for stabilizing and facilitate the process.

The process according to the invention may be carried out using relatively inexpensive raw materials (calcined alumina and metallic aluminium). Compared to other processes this makes it possible to prepare affordable products. This is a decisive factor for high volume uses, such as for refractory materials.

The process for the preparation of spherical, submicron particles of aluminium oxide is aluminothermic and thus the disadvantages of carbothermic processes are avoided, such as the formation of carbides and oxycarbides.

The use of pure raw materials, such as high grade alumina, high purity aluminium and electrodes made of high-purity graphite makes it possible to produce high purity qualities of submicron/nanoalumina. This opens up a range of uses such as high-performance structural ceramics, advanced polishing agents such as for semiconductors, raw material for the preparation of optical and functional ceramics, bioceramics and so forth.

Having described preferred embodiments of the invention it will be apparent to those skilled in the art that other embodiments incorporating the concepts may be used. These and other examples of the invention illustrated above are intended by way of example only and the actual scope of the invention is to be determined from the following claims.

The invention claimed is:

1. A process for the production of spherical submicron particles of aluminium oxide ($Al_2O_3$), wherein aluminium oxide and aluminium metal are added into a reaction vessel comprising a pool of at least aluminium oxide in molten state, serving as a heat reservoir for the process, whereby aluminium oxide reacts with aluminium metal producing aluminium sub-oxides gases and aluminium vapour, whereafter the sub-oxides and the aluminium vapour are oxidized above the molten pool of aluminium oxide to give aluminium oxide in the form of spherical submicron particles.

2. The process according to claim 1, wherein the pool of at least aluminium oxide in molten state comprises 20-50 weight % aluminium oxide and 50-80 weight % zirconium dioxide.

3. The process according to claim 1, wherein the pool of at least aluminium oxide in molten state comprises 30-55 weight % aluminium oxide and 45-70 weight % zirconium dioxide.

4. The process according to, claim 1 wherein aluminium oxide and aluminium metal are injected into the reaction vessel.

5. The process according to claim 1, wherein the oxidation of the aluminium vapour and aluminium sub-oxides is carried out in air or oxygen.

6. The process of claim 1, wherein a gas is injected into the molten pool of aluminium oxide for increasing the partial pressure of aluminium sub-oxides being released from the pool.

7. The process of claim 6, wherein the gas is an oxidizing or a neutral gas, selected from the group consisting of air or nitrogen or other inert gases.

8. The process of claim 1, wherein the obtained aluminium oxide particles are captured in a filter.

9. The process of claim 8, wherein the process further comprises removing NOx contained in the off-gases.

10. The process of claim 1, wherein calcined alumina and metallic aluminium are used as raw materials.

* * * * *